United States Patent [19]

Johnson et al.

[11] Patent Number: 5,403,109
[45] Date of Patent: Apr. 4, 1995

[54] FASTENING DEVICE FOR FURNITURE CONSTRUCTION AND METHOD OF MANUFACTURE

[75] Inventors: Robert C. Johnson; Joseph D. Keitel, both of Muscatine, Iowa

[73] Assignee: Hon Industries Inc., Muscatine, Iowa

[21] Appl. No.: 73,690

[22] Filed: Jun. 9, 1993

[51] Int. Cl.⁶ .............................................. B25G 3/00
[52] U.S. Cl. ..................................... 403/231; 403/245; 403/407.1
[58] Field of Search ..................... 403/231, 245, 407.1, 403/315, 316, 317, 376, 380, 397

[56] References Cited

U.S. PATENT DOCUMENTS

| | | |
|---|---|---|
| 1,136,811 | 4/1915 | Kasanszky et al. . |
| 2,279,864 | 4/1942 | Eide . |
| 3,000,680 | 9/1961 | Zelenko . |
| 3,389,666 | 6/1968 | Schultze-Bonatz . |
| 3,456,969 | 7/1969 | Wittenmayer . |
| 3,527,280 | 9/1970 | MacNorius . |
| 3,527,486 | 9/1970 | Gamp . |
| 3,838,902 | 10/1974 | Tenani . |
| 3,870,390 | 3/1975 | Herrmann . |
| 3,966,339 | 6/1976 | Nemecek et al. . |
| 4,060,949 | 12/1977 | Busse ............................ 403/231 |
| 4,163,618 | 8/1979 | Giovannetti ..................... 403/245 |
| 4,325,649 | 4/1982 | Rock ............................... 403/231 |
| 4,326,760 | 4/1982 | Ziegelheim et al. . |
| 4,353,663 | 10/1982 | Glickman ........................ 403/231 |
| 4,397,064 | 8/1983 | Lautenschlager et al. ......... 403/231 |
| 4,536,044 | 8/1985 | Ziegelheim et al. . |
| 4,595,105 | 6/1986 | Gold . |
| 4,869,564 | 9/1989 | Lechman . |
| 4,886,326 | 12/1989 | Kuzyk . |
| 4,923,321 | 5/1990 | Kriz ................................. 403/231 |
| 5,143,473 | 9/1992 | Harley . |

FOREIGN PATENT DOCUMENTS

| | | | |
|---|---|---|---|
| 1211177 | 12/1958 | France ............................ 403/231 |
| 2445461 | 8/1980 | France ............................ 403/231 |
| 1237400 | 6/1971 | United Kingdom ................ 403/231 |

*Primary Examiner*—John T. Kwon
*Attorney, Agent, or Firm*—Jones, Day, Reavis & Pogue

[57] ABSTRACT

A fastening assembly for securing first and second panel components in side-by-side abutting relationship. Each of the panel components include opposite side surfaces and edge surfaces therebetween, the fastening assembly including a system for joining the panel components one to the other in which an elongated open channel extends from an edge surface and into the face of one of the side surfaces of the first panel component. An elongated fastening element is disposed within a bore in a surface of the second panel component and is adapted for insertion into the channel, the channel being closed by an insert so that the elongated fastening element is covered by the insert when the panel components are brought into abutting relationship and joined by the elongated fastening element.

17 Claims, 3 Drawing Sheets

FASTENING DEVICE FOR FURNITURE CONSTRUCTION AND METHOD OF MANUFACTURE

BACKGROUND OF THE INVENTION

This invention relates to a fastening device for office furniture and more particularly to a design which aligns and connects two adjacent furniture components. In a preferred embodiment, the fastening device includes three cooperating members, one being a rotatable member, another a bolt-like member and the third an elongated insert having dove-tailed sides.

Various proposals have been made for designs and methods of constructing office furniture which are intended to facilitate ease of assembly. One such proposal is disclosed in U.S. Pat. No. 4,869,564, wherein releasably securable connecting members are used to interconnect planar panels. The connections between adjacent panels are made using a conventional connecting device comprising an elongated metallic element which is externally threaded at one end for engagement in one of the panels. A cooperating plug member is disposed within a cylindrical bore in a second, supporting panel, with its central longitudinal axis coincident with the central axis of the bore. Access of the elongated member to the plug is provided by a precision drilled, precisely dimensioned cylindrical passageway communicating with the plug and extending in a radial direction with respect to its central axis.

The design of the connector in U.S. Pat. No. 4,869,564 is subject to a number of limitations. The requirement of a precisely dimensioned bore which provides access to the plug requires close tolerances which are often difficult to achieve in a high speed manual production process. Moreover, the axes of the bores for the plug and the elongated member will be perpendicular in those applications where the panels are assembled at true right angles. The two bores must therefore be made in two manufacturing steps, and must be drilled from two adjacent surfaces of the supporting panel, thus precluding manufacture using conventional automated multi-tool routers.

OBJECTS

Accordingly, it is a general object of this invention to provide a fastening device which overcomes the disadvantages of the prior art.

It is a further object of this invention to provide an improved design for fastening devices for the construction of wood furniture which facilitates automated production of such furniture from flat wood panels.

It is a more specific object to provide a fastening device which will provide good structural integrity and strength, pleasing aesthetic appearance and economy of production.

It is a related object of this invention to provide a fastening device which utilizes conventional fastening elements in a novel manner using a unique insert which conceals a portion of the fastening device to achieve an aesthetically pleasing finished furniture surface.

It is a more particular object of the invention to provide a fastening device which can be employed in the assembly of wood furniture which is manufactured using automated manufacturing means such as a numeric controlled router having a flat bed over which the router head can be programmed to move in three directions.

It is a further object of the invention to provide improved methods of manufacturing office furniture, including desks.

It is a again a more particular object of this invention to provide improved methods of manufacture which readily permit economical production of a wide variety of completed office furniture, on demand, in a continuous production operation from a stock of flat wood panels using automatic tooling such as multi-tool routers with numeric controllers.

SUMMARY OF THE INVENTION

The fastening device of this invention is adapted to be used in the manufacture and assembly of office furniture which is cut from standard pre-finished flat wood panels. Such panel parts are then subassembled into appropriate furniture components, with subsequent assembly of those components into the completed furniture unit.

The panels may be solid wood, plywood or conventional wood particle board panels, such as high density particle boards, with a thickness of $\frac{5}{8}$ inch or $\frac{3}{4}$ inch, which have a thin finished laminate bonded on one side, and which can have a balancing laminate bonded on the opposite side to seal the opposite side and to prevent warping. Examples of such finished laminates include paper foils of about 0.007 inch thickness and high pressure laminates of about 0.031 inch thickness. Such particle board typically is of varying density through its thickness, being of relatively high density near each side surface and low density in the center core zone. Fasteners penetrating through a side surface will therefore be retained much more firmly than fasteners penetrating through an edge surface. All of the furniture parts are cut and formed from such flat wood panels, preferably using automatic tooling such as multi-tool routers with numerical computer controls.

Use of the subject fastening device facilitates the manufacture of the several parts necessary for each furniture unit, and such parts can be cut from panels of standard thickness entirely in automated router machine operations. The fasteners are then inserted manually at precisely machine-defined locations and the parts are easily and accurately sub-assembled into furniture components. The components can then be assembled readily into the complete furniture unit, all at machine side if so desired, without exposed fasteners and with all major exposed surfaces being the prefinished panel surfaces, with the edge surfaces being hidden or separately covered, thereby providing a finished product which is ready for shipment to customers directly from machine-side.

A fastening device of this invention comprises three cooperating elements, including a housing member, a bolt-like member and an insert. The housing member includes a recess in a portion of its periphery and is adapted to be located within a bore drilled in the surface of a supporting panel. The bolt-like member has a first end for securement to a second furniture panel and a second, oppositely disposed end for disposition within the recess in the housing member, the housing member being rotatable in a first rotational direction about an axis extending through the bore to lock the head within the recess, thereby securing the two panels together. The bolt-like member accesses the plug through an open channel routed in the surface of the supporting panel. The insert is inserted into the channel and covers and conceals the bolt-like member.

A further embodiment of the fastening device can be employed to reinforce the securement of adjacent, abutted component panels. In keeping with this invention, plural pairs of axially aligned bores can be provided in abutting panel surfaces, with a conventional wooden dowel disposed therein. One of the bores is preferably drilled in a first component panel, while the second bore is formed by the combination of a routed channel in the surface of the second component panel and an insert disposed therein. The insert also covers and conceals the dowel when the furniture unit is fully assembled.

It should be understood that the drawings are not necessarily to scale and that an embodiment is sometimes illustrated in part by schematic and fragmentary views. It should also be understood, of course, that the invention is not necessarily limited to the particular embodiments illustrated herein.

DESCRIPTION OF THE PREFERRED EMBODIMENTS

Figure 1:
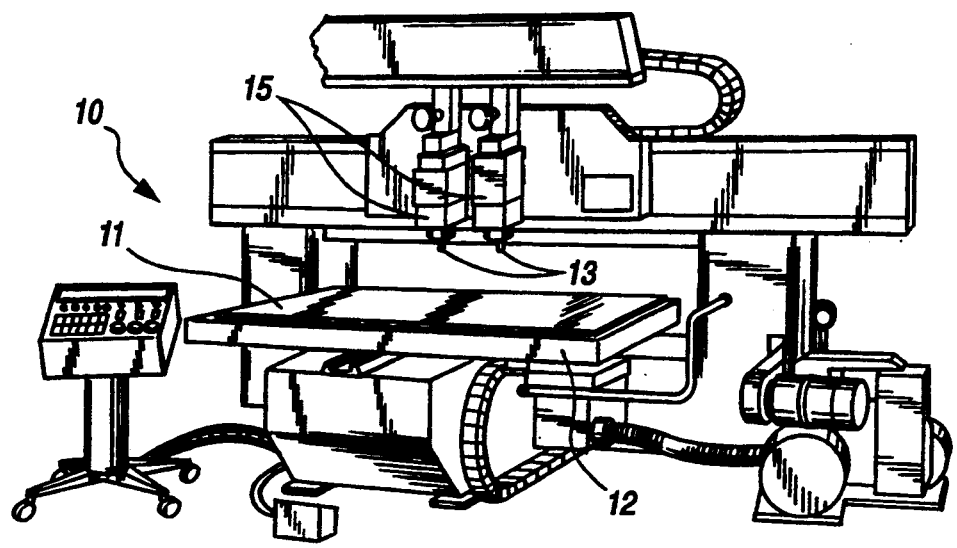
FIG. 1 is a perspective view of an exemplary automated multi-tool router of the type most useful in forming the fastening device of the present invention.

The present invention comprehends the design of a fastening device and the manufacture of furniture units which are composed of separate panels which are cut and routed to their final configurations using an automated multi-tool router with numeric controls such as that designated generally as 10 as shown in FIG. 1. All of the panel components of the furniture unit are preferably laid out for cutting and routing to their final configuration from a single stock wood panel such as a particle board panel which has a thin finish laminate on its upper side and a balancing laminate on its underside. The stock panel 11 is placed on the router bed 12 so that the machine tools 13 held by router heads 15 can move over the panel in three directions to cut and rout the required components in a single router machining operation. One skilled in this art will appreciate that automatic routers, other than that depicted in FIG. 1, can be utilized to cut the stock panel into component parts. Particularly advantageous are automated routing machines having router heads with rotatable turrets that can accommodate multiple machine tools and which are capable of sequentially presenting a preselected cutting tool to a desired location.

In commercial embodiments, the panels are preferably formed of an industrial grade of wood particle board, such as 45 lb particle board, and are cut and finished to size with close tolerances. The panels include at least a covering of a plastic laminate bonded to those surfaces which are exposed when the furniture unit is fully assembled. The panels are also preferably self-edged, so that all exposed surfaces of the furniture unit are covered with plastic. This gives the completed article a rich and attractive finished appearance.

Figure 2:
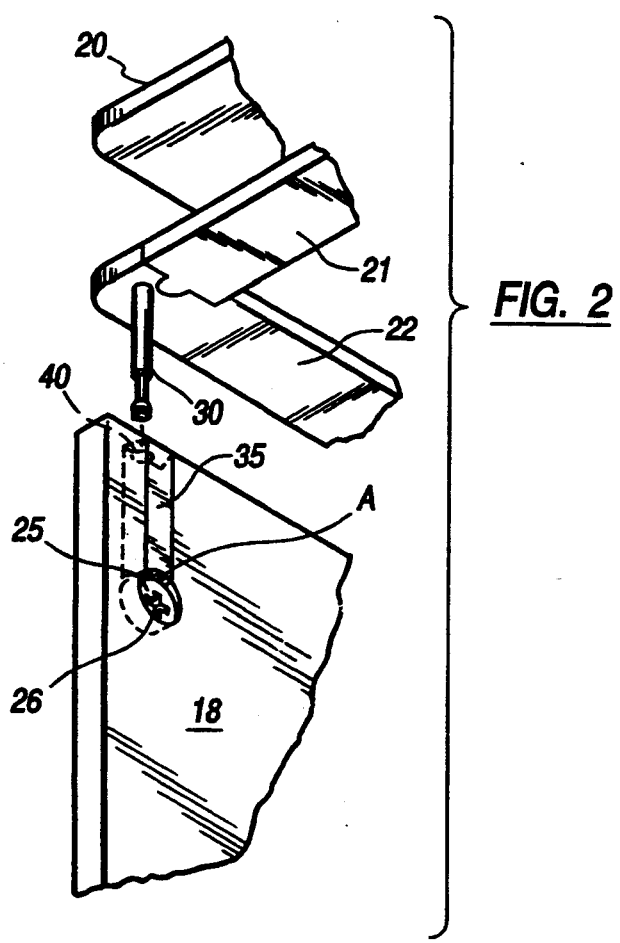
FIG. 2 is an exploded perspective view of the fastening device constructed in accordance with this invention.
Figure 3:
FIG. 3 is a perspective view of a machine tool which can be utilized with the router of FIG. 1 to form the channel of the fastening device shown in FIG. 2.

The present invention is most effectively utilized in a multi-component assembly comprising generally planar support panels and a plurality of cooperating fastening devices. An example of such a layout is illustrated in FIG. 2, where a furniture subassembly is shown comprising a supporting panel 18 and a top panel structure 20. Component members 21 and 22 provide reinforcement for the top panel member 20, and also provide visual thickness. As shown in FIG. 2, the fastening devices comprise a housing member 25 which is drive-fit into a counterbore 26 in supporting panel 18, and a cooperating bolt-like member 30 which is connected to a second panel member 22. Access of the bolt-like member to the housing member is provided by a passageway defined by an open channel 40 which is closed by a slidable insert 35 disposed therein. The bolt-like member and the housing member 25 are so arranged that when they are connected together, as will be described in greater detail hereinbelow, their associated panels (18 and 22) are rigidly and tightly abutted together.

The details of the construction and components of the fastening device will now be considered with reference to FIGS. 2–9. As disclosed by phantom lines in FIG. 2, a channel 40 is cut in supporting panel 18 in a single machining operation using a numeric controlled router with a special machine tool such as that disclosed in FIG. 3 having a presented end 41 for routing channel 40. The use of such a tool will produce a channel having a profile as disclosed in FIG. 4, with an opening 42, opposed dove-tailed sides 43, 44, land areas 45 and a semi-cylindrical trough 46. The insert 35 of the present invention is depicted more particularly in FIGS. 5–7. The insert 35 has a top surface 50, canted dove-tailed sides 53, 54 which extend downwardly and outwardly therefrom, and a bottom surface 55 having a semi-cylindrical passageway 56 formed therein. As shown most clearly in FIG. 6, the insert has foot areas 58 disposed on either side of the semi-cylindrical passageway 56. Also as disclosed in FIGS. 5–7, the insert is designed to have a through-opening 59 which prevents hot spots from developing during molding in the event the insert is formed of a plastic material.

Figure 4:
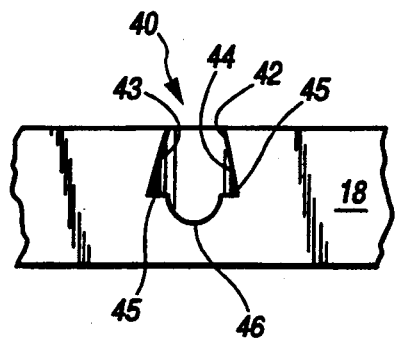
FIG. 4 is a side elevational view of a portion of a furniture panel showing the channel of the fastening device of this invention.
Figure 5:
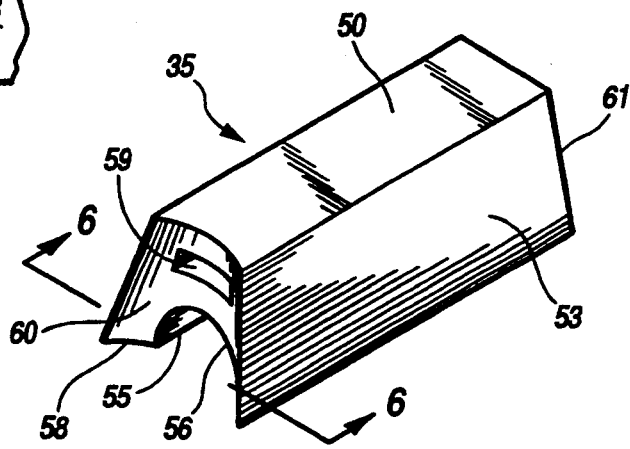
FIG. 5 is a perspective view of the insert of the fastening device.
Figure 6:
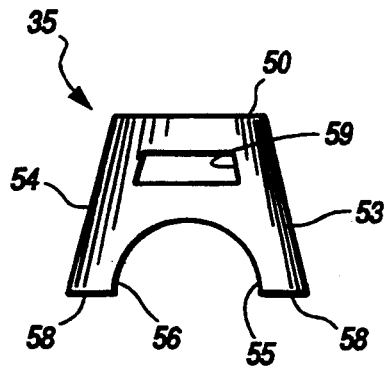
FIG. 6 is a sectional of the insert taken along line 6—6 of FIG. 5.

In accordance with an aspect of this invention, the insert is adapted and dimensioned to slide within the open channel shown in FIG. 4. The feet 58 of the insert 35 are dimensioned to slide along the land areas 45 of the open channel, and the sides of the insert 53, 54 are formed to closely parallel the dove-tailed sides 43, 44 of the channel so that the insert is loosely retained within the channel. As shown in FIG. 2, when the insert is retained within the channel 40, the top surface 50 of the insert is coextensive with the adjacent surface of the supporting panel 18.

Figure 7:
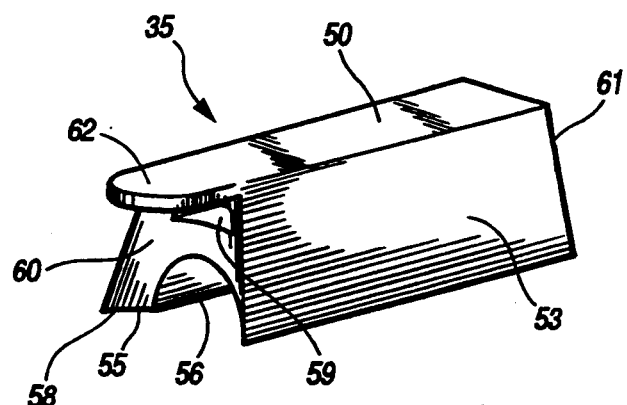
FIG. 7 is a perspective view of an alternative insert with a tab extending from one end thereof.
Figure 12:
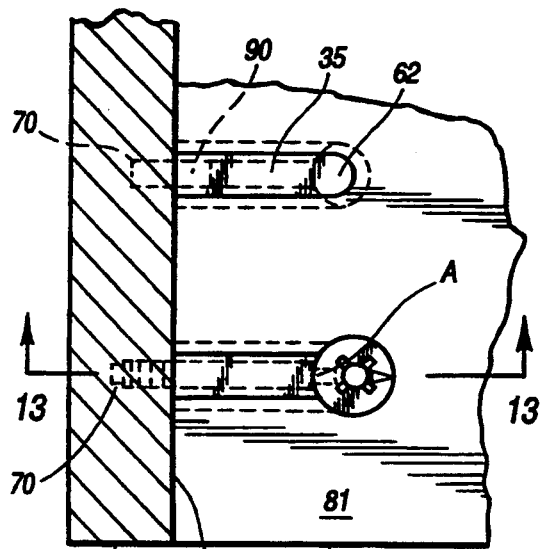
FIG. 12 is a plan view showing the elements of FIG. 10, with some hidden details in phantom line, but depicting the fastening device after assembly of the furniture panels.

In accordance with a further aspect of this invention, one end 60 of the insert 35 follows an arc A (as shown in FIGS. 2 and 12) of approximately 60°; the other end 61 being square with the top surface. As shown in FIG. 7, a thin rounded tab 62 can be formed to extend from top surface 50 to project over the curved end 60 of the insert which follows arc A. As will be explained in greater detail below, the curved end of the insert is intended to fit closely against the rounded peripheral surface of the housing member 25 of the fastening device. An insert with a projecting tab 62 is used in connection with an alternative embodiment of the fastening device of this invention, as will be explained in detail hereinafter.

Figure 8:
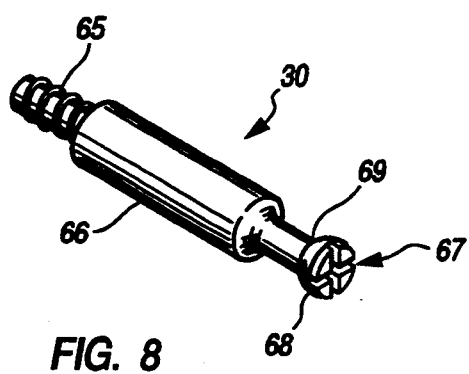
FIG. 8 is a perspective view of the bolt-like member of the fastening device shown in FIG. 2.
Figure 10:
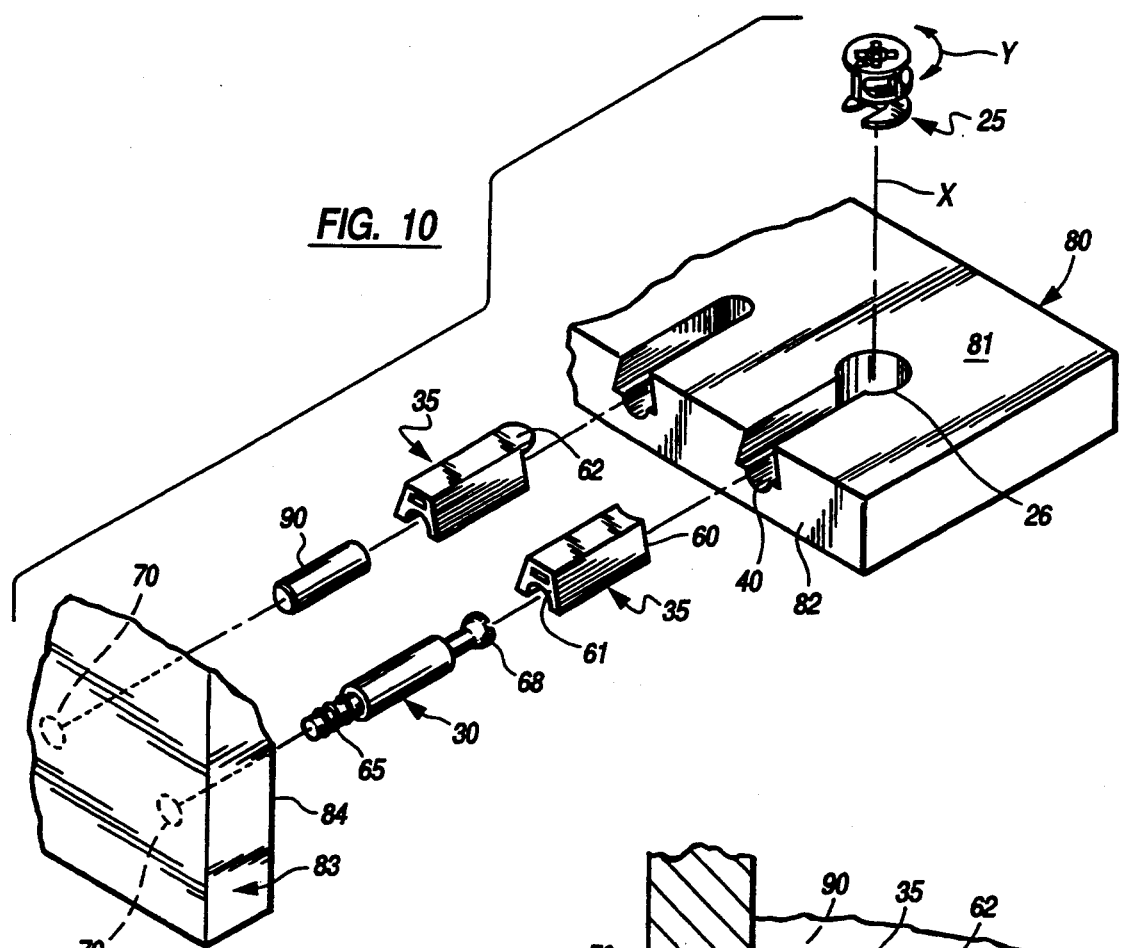
FIG. 10 is an enlarged exploded perspective view of two adjacent furniture panels showing alternative embodiments of the fastening device of the present invention.
Figure 13:
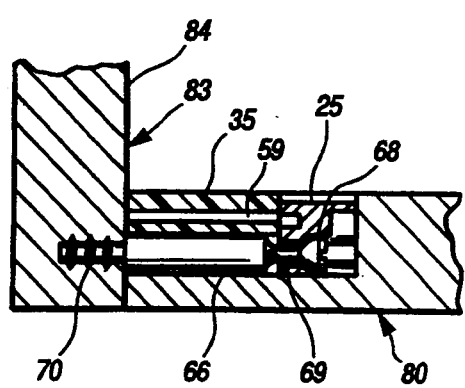
FIG. 13 is a sectional view taken along line 13—13 of FIG. 12.

As shown in FIG. 2, the bolt-like member 30 and housing member 25 are conventional, readily connectable devices used to secure the panel components to one another in the finished furniture assembly. These fasteners, and the manner of their attachment to the panels and their joining to one another, are illustrated in FIGS. 10, 12 and 13. Such fasteners are available commercially from Hafele American Company and are offered under the trade designation MINIFIX CONNECTORS. Each of these fasteners includes a bolt-like member 30 which, as best shown in FIG. 8, is an elongated, metallic element having a first end 65 which is externally threaded, a cylindrical intermediate portion 66, and a second and oppositely disposed end 67 in the form of a bulbous head 68. The intermediate portion of the bolt-like member 30 which is contiguous with the head 68 is necked down at 69 to be of smaller diameter than the head and the remaining intermediate portion 66. The head 68 is slotted for engagement by a driving tool, such as a screwdriver, and each bolt-like member 30 is screwed into a hole (70 in FIG. 10) bored into a major face of a panel member, such as intermediate reinforcing member 22 as shown in FIG. 2.

Figure 9:
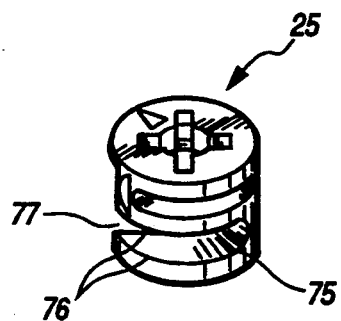
FIG. 9 is a perspective view of another element of the fastening device used to assemble the furniture panels as shown in FIG. 2.

The housing member 25, disclosed separately in FIG. 9, is a cylindrical metallic camming element having a hollow center and a slot 75 through a substantial portion, for example 180°, of its peripheral surface. The housing member is thus bifurcated by the slot 75, which has an opening 77 of slightly greater diameter than the head 68 of the bolt-like member 30. The housing member further includes an exposed slotted drive head 78 by which the housing member can be rotated in its counterbore 26, such as through the use of a screwdriver or similar tool.

When the bolt-like member and the housing member are arranged to be connected to each other to effect the securement of the two panels to which they are attached, the head 68 and neck portion 69 of the bolt-like member 30 are placed within the hollow center of the housing member 25. Rotary camming surfaces 76 thus straddle the neck of the bolt-like member, the cam surfaces engaging the inner end of the head with a drawing action as the cam is rotated by an appropriate turning tool such as a screwdriver. The gripping, drawing and retaining action of the cam surfaces establishes and maintains firm abutting contact between the respective edge surface of the panel in which the bolt-like member is mounted (such as the reinforcing panel 22 shown in FIG. 2) with the side surface of the panel in which the housing member is mounted (such as the supporting panel 18 in FIG. 2), as further illustrated in FIGS. 12 and 13.

As shown in FIGS. 10 and 12, the housing member is disposed within a cylindrical bore 26, preferably formed by a first routing operation in a supporting panel 80 having a major surface 81 and an adjacent edge surface 82 disposed thereto at 90°. The bore 26 is precision drilled to be precisely dimensioned to snugly receive the housing member 25, while still enabling it to be readily rotated about its axis X in the direction of arrows Y. As shown in FIG. 10, the cylindrical bore is preferably spaced inwardly from the edge surface 82, so that the housing is substantially surrounded by the material of supporting panel 80. In this way, the housing is more securely mounted in the supporting panel than if it were disposed immediately adjacent edge 82, thus taking advantage of the strength provided by the surrounding material.

A second routing operation forms the dove-tailed channel 40 in the supporting panel, providing access to the cylindrical bore 26 from edge surface 82. Those skilled in the art will appreciate that both the cylindrical bore 26 and the open channel 40 can be cut from above the major surface 81 of supporting panel 80, as by an automated multi-tool router. As contemplated by the present invention, there is no need to re-jig supporting panel 80 to bore open channel 40 in a third machining axis from edge surface 82. Both the cylindrical bore 26 and the open channel 40 can therefore be formed by sequential machining operations in the supporting panel 80 on a router bed such as that illustrated in FIG. 1, without realigning the supporting panel for further machining operations.

In a third routing operation, the bore 70 is formed in the surface of panel 83, as shown in FIGS. 10, 12 and 13. The threaded end 65 of bolt-like member 30 is then threadedly engaged in bore 70 such that the bolt-like member 30 projects from the surface 84 of panel 83.

Figure 11:
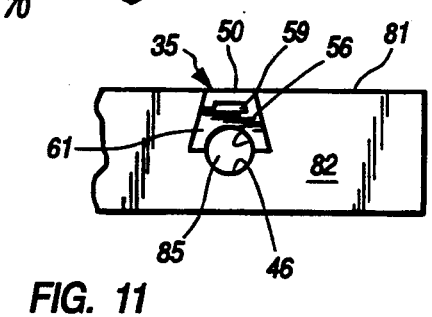
FIG. 11 is a side elevational view of a portion of a furniture panel showing the channel and insert of this invention.

In keeping with the invention, the insert 35 is placed in the open channel from edge surface 82 by first introducing the curved end 60 of the insert into the channel and then sliding the insert therealong until the curved surface 60 of the insert 35 impinges and abuts the cylindrical housing element 25 as shown in FIG. 12. When the insert 35 is placed within the channel 40, and as best shown with reference to FIG. 11, a passageway 85 is defined by the semi-cylindrical surface 56 of the insert and the semi-cylindrical trough of the channel 40. The bolt-like member 30 is introduced into and moved through this passageway 85, as shown in FIGS. 12 and 13, until its head 68 is located within opening 77. The housing member is then rotated approximately 180° about its axis X, whereupon the head 68 and neck 69 of the bolt-like member slide down the slot 75. The cam surfaces 76 of the housing member cooperate with the head and neck to pull the bolt-like member to the position shown in FIG. 13.

When the head 68 of the bolt-like member is drawn into the housing member 25, not only are the two panels 80, 83 rigidly and tightly secured together, but the head 68 of the bolt-like member is locked in the slot 75 of the housing member to preclude accidental loosening of the connection. The two panels 80, 83 can be disconnected, if desired, by rotating the housing member 180° in the opposite rotational direction so that the head of the bolt-like member is again disposed in the opening 77. From this position, the bolt-like member can be withdrawn from the housing member.

A further embodiment of the subject invention is disclosed in FIGS. 10 and 12. As shown therein, a snug and tight connection can be formed between the two adjacent panels 80 and 83 by use of a dowel as opposed to the bolt-like member and housing member shown in those same figures. Again, a suitable bore 70 is located in the surface 84 of panel 83, this bore to receive one end of a short dowel 90. The other end of the dowel is inserted into a passageway formed between the insert 35 and the trough of the open channel 40. As shown in FIG. 10, in this embodiment of the invention, neither a cylindrical bore 26 nor a housing element 25 is required, and thus an insert having a rounded tab 62 projecting over the one end 60 of the insert is introduced into the channel to close the rounded end of the channel which is formed when the channel is routed by a rotating machine tool such as that shown in FIG. 3. When the dowels, or similar elements, are inserted into bores 70 and passageway 80 so that the panels 80 and 83 are brought into abutting relation, the dowels provide good resistance to shear forces between the panels and thus provide good strength and rigidity to the assembled structure. Moreover, the dowels ensure accurate registration of the component parts during assembly. When the dowels are supplied with an adhesive, a secure, permanent connection can be achieved. Because the insert 35 completely covers open channel 40, no post-assembly finishing is required.

In the preferred method of this invention, separate layouts are created for producing all of the panel parts for one complete assembly of a unit of furniture from as few stock wood panels as possible, and preferably from a single stock flat wood panel. Such panels are typically 49 inches to 61 inches wide and eight feet to sixteen feet long. For example, a conventional desk is often laid out on a router bed for cutting by an automated multi-tool router from two blanks, one for the top panel, and all other panel parts from a second blank. The layout includes the precise locations for all subassembly components and fasteners, including the bores and recesses for all fasteners for accurate positional interfitting relationship of all of the component parts. Appropriate instructions for precise automated cutting and routing of all shapes, bores and channels of the various parts are recorded for read out in the controls in the automatic, multi-tool numerically controlled router. Typically, all parts are cut from one or two panels and require a corresponding number of machine set-up operations comprising one set-up per panel. Thus, the counterbore 26, the open channel 40 and the bore 70 are made sequentially in a series of machining operations, without rejigging any of the panel parts cut from the stock-wood panel.

The assembly dowels, bolt-like members, housing members and inserts are then manually inserted and secured in the panel parts, adjacent the machine site. The components to be formed of multiple panel parts are sub-assembled in the same manner. In producing a furniture unit, these subassembly operations include the assembly of the fastener components in the machine-formed bores and channels which precisely define the locations for all such components.

The resulting furniture units are assembled and joined to one another by assembling the various panels by aligning and securing the respective fastening devices of this invention. All of the panels are secured in firm abutting relationship with one another by the interfitting dowels of the subject fastening device, or by cam-type quick attachment fasteners as disclosed herein.

Various modifications of the illustrated preferred embodiments may be made without departing from the spirit and scope of this invention. For example, various flat wood panels may be used and the furniture units may be of a wide variety of designs, intended for different functional purposes. Other quick fasteners may also be used, though a design which assures snug abutting relation of the joined panel components, as by a cam action, is preferred.

While particular embodiments of this invention are shown and described herein, it will be understood that the invention is not to be limited thereto since many modifications may be made by those skilled in the art, particularly in light of the foregoing teachings. It is contemplated, therefore, that the appended claims should cover any modification which falls within the true spirit and scope of this invention.

We claim as our invention:

1. A fastening assembly for securing first and second panel components in side-by-side abutting relationship, each of said panel components including opposite side surfaces and edge surfaces therebetween, said fastening assembly comprising means for joining said panel components one to the other wherein an elongated open channel extending from one of said edge surfaces and into the face of one of said side surfaces is formed in said first panel component, an elongated fastening element adapted for insertion into said channel is disposed within a bore in one of said surfaces of said second panel component, the channel being closed by an insert, said insert being adapted to be inserted into said open channel from said one of said edge surfaces of said first panel component, said elongated fastening element being covered by said insert when said panels are brought into side-by-side abutting element and said open channel having a base portion which is of greater width than the opening formed in the face of said side surface of said first panel component.

2. The fastening assembly as in claim 1 wherein said elongated fastening element is a wooden dowel member.

3. The fastening assembly as in claim 2 wherein said wooden dowel member extends into and terminates in each of said first and second panel components to provide resistance to shear stresses between the joined panel components.

4. The fastening assembly as in claim 1 wherein said panel components are joined together in T-joint engagement, with an edge surface of one of said panel components in abutting relation with a side surface of the other panel component at said joint.

5. The fastening assembly as in claim 1 wherein said means for joining said panel components includes detachable fasteners affixing said components to one another in abutting relationship.

6. The fastening assembly as in claim 5 wherein said detachable fasteners includes first and second mateable components, said first mateable component being affixed to said first panel component, and said second mateable component comprising said elongated fastening element disposed in said second panel component.

7. The fastening assembly as in claim 6 wherein said first mateable component includes cam means cooperable with said fastening element for drawing said panel components into firm abutting contact with each other.

8. The fastening assembly as in claim 7 wherein said first mateable component is a housing member having a recess in a portion of its periphery, said housing member being disposed within a cylindrical bore in said first panel component, said second mateable component comprising said elongated fastening element having a first end for securement to said second panel component and a second end opposite said first end, said second end having a head for disposition within the recess of said housing member, said housing member being rotatable in a first direction about an axis extending through the bore in which said housing member is disposed to lock the head of said elongated fastening member therewithin and thereby secure the panel components one to the other.

9. The fastening assembly as in claim 8 wherein said head of said elongated fastening element is of greater width than a contiguous portion thereof, said recess in said housing member comprising an entrance of sufficient size for the head of said elongated fastening element to extend therethrough and additionally having an associated slot.

10. The fastening assembly as in claim 9 wherein said slot includes at least one cam surface for engaging a portion of the head to pull said elongated fastening element closer to said housing member when said housing member is rotated in said first direction.

11. The fastening assembly as in claim 8 wherein said housing member and said elongated fastening element are formed so that upon the rotation of said housing member in said first direction said elongated fastening element is pulled closer to said housing member to effect a rigid and tight abutting relationship between said panel components.

12. The fastening assembly as in claim 11 wherein said first end of said elongated fastening element is threaded for releasable securement within the bore in said one of said surfaces of said second panel component.

13. The fastening assembly as in claim 1 wherein said panel components are formed of word particle board and have a laminate covering on at least one of the side surfaces thereof.

14. The fastening assembly as in claim 1 wherein the base portion of said open channel has a semi-cylindrical trough formed therein and said insert has a top surface and a bottom surface opposite said top surface, said bottom surface of said insert having a semi-cylindrical passageway formed therein so that when said insert is inserted into said open channel a cylindrical passageway is formed therebetween.

15. The fastening assembly as in claim 14 wherein said insert and said open channel have complemental dovetailed side surfaces which coact to preclude the outward movement of said insert from the open channel formed in said side surface of said first panel component.

16. The fastening assembly as in claim 15 wherein the top surface of said insert is coextensive with the adjacent surface of said first panel component.

17. The fastening assembly as in claim 16 wherein said means for joining said panel components includes detachable fasteners affixing said components one to the other, said detachable fasteners including first and second mateable components, said first mateable component being affixed to said first panel component, said second mateable component comprising said elongated fastening element disposed in said second panel component, and said first mateable component including cam means cooperable with said fastening element for drawing said panel components into firm abutting contact.

* * * * *